No. 12,361. REISSUED JUNE 20, 1905.

W. I. FOLLETT.

TIME STAMP.

APPLICATION FILED MAY 13, 1905.

3 SHEETS—SHEET 1.

Witnesses
L. L. Browning
H. H. Lamson

Inventor
Wilbur I. Follett
By his Attorney
Edward C. Davidson

PHOTO-LITHOGRAPHED BY SACKETT & WILHELMS LITHO. & PTG. CO. NEW YORK.

No. 12,361. REISSUED JUNE 20, 1905.

W. I. FOLLETT.

TIME STAMP.

APPLICATION FILED MAY 13, 1905.

3 SHEETS—SHEET 2.

Witnesses
L. F. Browning
L. H. Samson.

Inventor
Wilbur I. Follett
By his Attorney
Edward C. Davidson.

PHOTO-LITHOGRAPHED BY SACKETT & WILHELMS LITHO. & PTG. CO. NEW YORK.

No. 12,361. REISSUED JUNE 20, 1905.

W. I. FOLLETT.

TIME STAMP.

APPLICATION FILED MAY 13, 1905.

3 SHEETS—SHEET 3.

Witnesses
L. F. Browning
L. L. Samson.

Inventor
Wilbur I. Follett
By his Attorney
Edward C. Davidson

PHOTO-LITHOGRAPHED BY SACHETT & WILMELMS LITHO & PT'G CO. NEW YORK.

No. 12,361. Reissued June 20, 1905.

UNITED STATES PATENT OFFICE.

WILBUR I. FOLLETT, OF NEW YORK, N. Y.

TIME-STAMP.

SPECIFICATION forming part of Reissued Letters Patent No. 12,361, dated June 20, 1905.

Original No. 777,891, dated December 20, 1904. Application for reissue filed May 13, 1905. Serial No. 260,351.

*To all whom it may concern:*

Be it known that I, WILBUR I. FOLLETT, a citizen of the United States of America, residing in the borough of Brooklyn, city of New York, State of New York, formerly of Mendham, county of Morris, State of New Jersey, have invented certain new and useful Improvements in Time-Stamps, of which the following is a specification.

This invention relates to time-stamps of the character disclosed in my application, Serial No. 187,591, filed January 2, 1904; and its object is to improve and simplify the construction.

Figure 1:
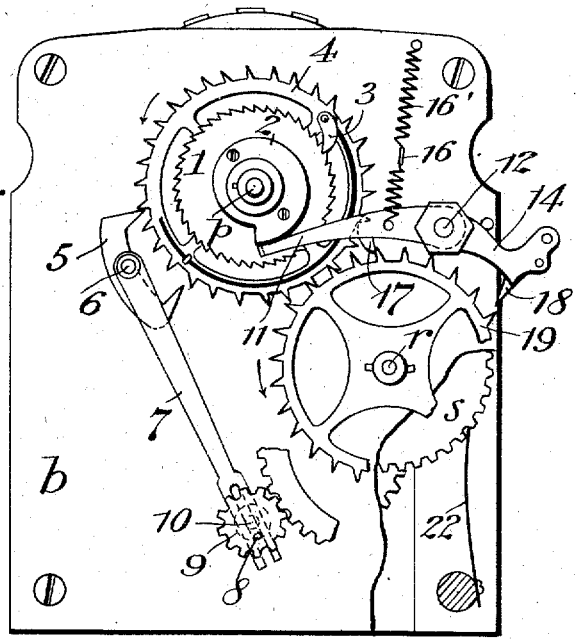
Figure 2:
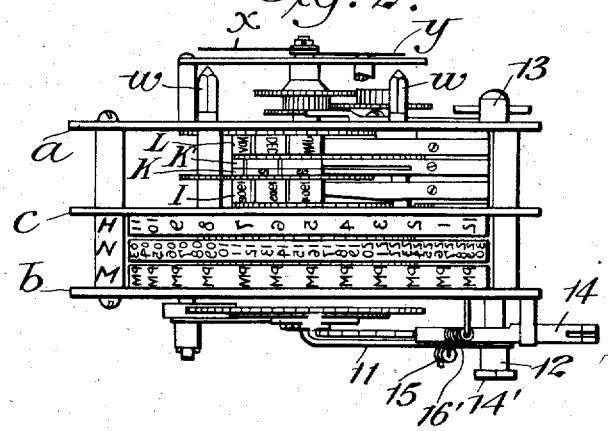
Figure 3:
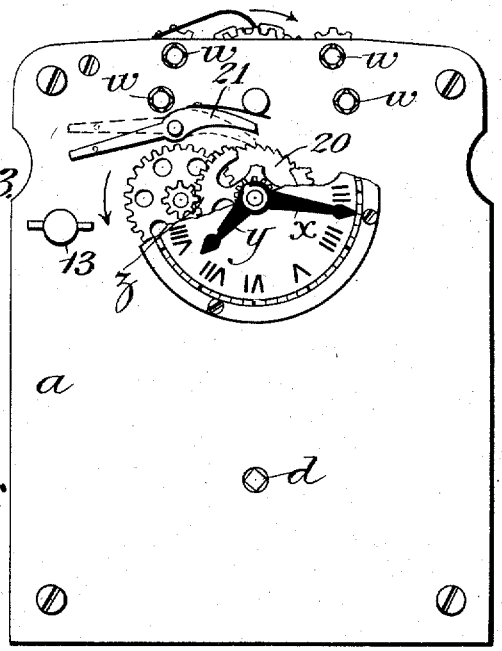
Figure 4:
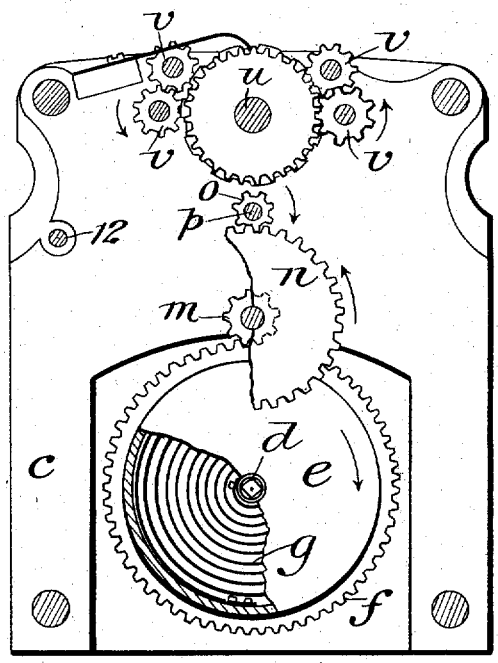
Figure 5:
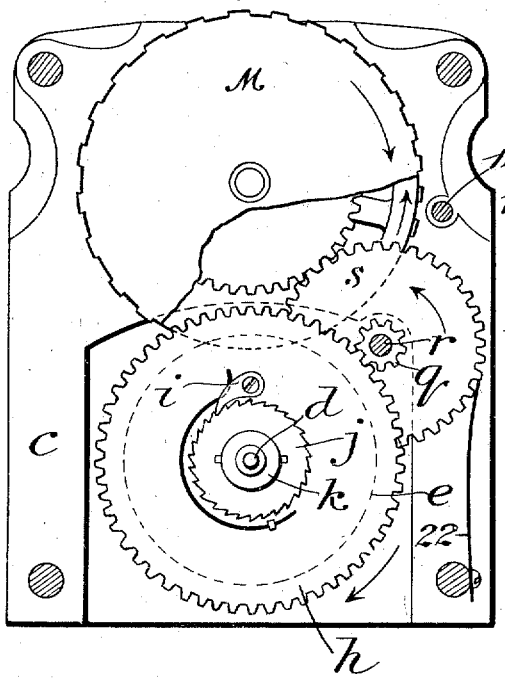
Figure 6:
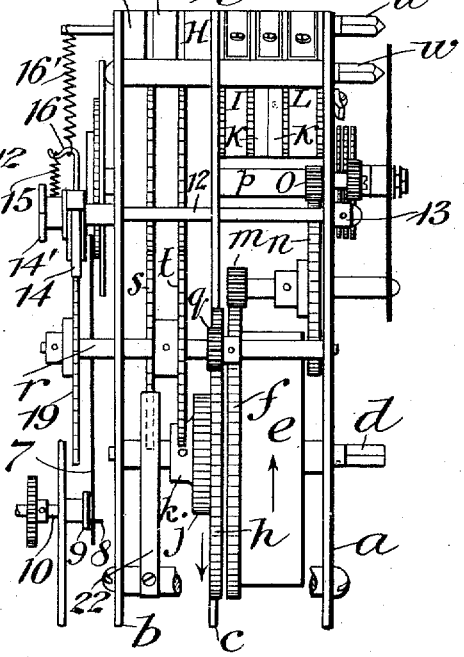
Figure 7:
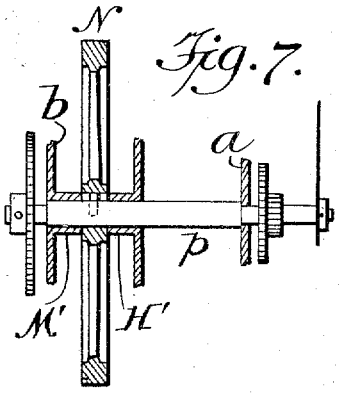
Figure 8:
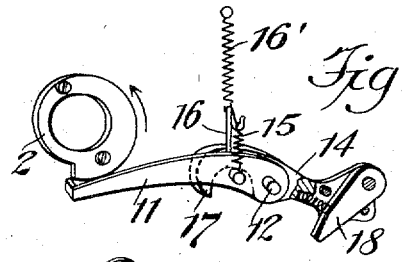
Figure 9:
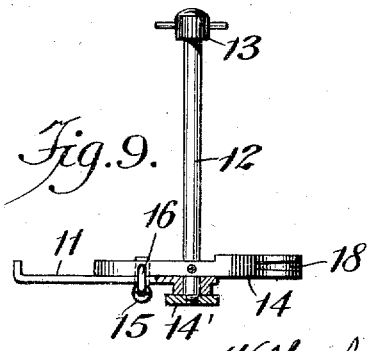

In the accompanying drawings, Figure 1 is a rear elevation; Fig. 2, a plan; Fig. 3, a front elevation; Fig. 4, a like view with the front frame-plate removed; Fig. 5, a rear elevation with the rear frame-plate removed; Fig. 6, a side elevation; Fig. 7, a detail view showing the minute-wheel shaft and independent hubs on which the hour and meridian wheels are mounted; Fig. 8, a detail view showing the cam on the minute-wheel shaft, the lever controlled thereby, and the hour-wheel escapement actuated by the lever; and Fig. 9, a plan of the parts shown in Fig. 8.

The frame may comprise a front plate *a*, rear plate *b*, and intermediate plate *c*, suitably connected by posts and serving to support the bearings of the various parts.

*d* is the winding-shaft of the spring-drum *e*, having at one side a gear *f* and containing a flat coiled spring *g*, the outer end of which is connected to the drum and the inner end to the shaft and the reaction of which tends to revolve the shaft and drum in opposite directions. On the shaft and alongside of the gear *f*, carried by the drum, is a similar gear *h*, carrying on its side a spring-pressed pawl *i*, that engages a ratchet-wheel *j*, secured to a hub or collar *k*, pinned to the shaft *d*. The gear *f*, which actuates the minute-wheel, meshes with a pinion *m* on a short shaft carrying a larger gear *n*, meshing with pinion *o* on the minute-printing-wheel shaft *p*. The gear *h* on the spring-drum shaft meshes with a pinion *q* on a shaft *r*, carrying two large gears *s t*. The gears *s t* mesh with corresponding gears formed with or attached to the meridian-wheel M and the hour-wheel H, so that these two printing-wheels are driven together at the same time. They are, however, mounted on independent hubs or bushings M′ H′, enveloping the minute-wheel shaft and projecting, respectively, from the rear plate *b* and intermediate plate *c*, and between their adjacent ends the minute printing-wheel N is fixed to the minute-wheel shaft *p*.

In front of the hour-printing wheel H and mounted on a shaft *u*, extending between the front and intermediate plates *a c*, are the year-wheel I, units day-wheel K, tens day-wheel K′, and month-wheel L. These four wheels are shown of much less diameter than the meridian, hour, and minute printing wheels and may be separately adjusted by pinions *v*, respectively engaging gears attached to or forming part of the wheels. Each pinion is mounted on a short shaft squared at its end to receive a key, as shown at *w* in Figs. 3 and 6. On the front end of the minute-printing-wheel shaft is the usual minute-hand *x*, and concentrically mounted therewith is the usual hour-hand *y*, connected by the usual hand-train *z*, Fig. 3. On the rear end of the minute-wheel shaft is keyed a ratchet-wheel 1, on the face of which is attached a cam 2. A spring-pressed pawl 3, pivoted on an escapement-wheel 4, loosely mounted on the minute-wheel shaft, engages the ratchet-wheel 1, thus compelling rotation of the minute-wheel shaft, with its minute-printing wheel and the escapement-wheel 4 in one direction. This escapement-wheel is properly controlled by an escapement operated by a clock-movement, which may be most conveniently placed within the casing of the instrument and in rear of the parts already described. Through the medium of the cam and lever coöperating therewith and an escapement coöperating with the escapement-wheel of the hour and meridian printing wheels the progressive rotation of the printing-wheels is accomplished.

The minute-wheel escapement 5 is carried by a stud pin or shaft 6 and has a downwardly-extending arm 7, slotted at its lower end, as shown in Fig. 1, to embrace a crank-pin 8, shown as projecting from a disk 9 on a shaft 10, forming part of the clock-train, but so geared and driven that it is rotated once in every two minutes by the clock-train, illustration of which has been omitted as unnecessary. Rotation of the shaft 10 therefore serves, by means of the loose sliding crank connection described, to carry the downwardly-extending arm 7 to the right, for instance, until the upper tooth of the escapement-lever disengages a tooth of the escapement-wheel 4 when the lower tooth has moved inwardly to catch the adjacent tooth next in rear thereof, the minute-wheel being thus advanced one step. Continued rotation of the shaft 10 finally carries the arm 7 to the left, permitting the lower tooth of the escapement-lever to disengage the wheel, whereupon the upper tooth holds the next tooth adjacent to it, the minute-printing wheel having been thereby again moved one step. In this way the minute-printing wheel is advanced step by step once each minute. The connection between the clock-train and the escapement mechanism being a loose sliding one, transmission of shocks and jars due to impact in use of the stamp are not transmitted through the escapement mechanism to the clock-train. Coöperating with the cam 2 on the minute-wheel shaft is a lever 11, loosely pivoted on a rock-shaft 12, that extends to the front of the instrument and is formed with a head cross-pin or handle 13. In the construction shown the lever is retained on the reduced end of the shaft 12 by a nut 14′. Fixed on shaft 12 adjacent lever 11 is an escapement-lever 14, and between a post 16 on the escapement-lever and a pin in lever 11 is a coiled tension-spring 15, that tends constantly to draw said pin up against the under face of the escapement-lever. The spring 15 is of sufficient strength to insure that the escapement-lever will move with the lever 11 as the latter follows the surface of the cam, against which it is drawn by coiled tension-spring 16′, attached to the back plate and to the post 16 on the escapement-lever. The escapement-lever 14 has a solid tooth 17 at one end and a pivoted spring-controlled tooth 18 at the other, and these will coöperate with the toothed escapement-wheel 19 on the shaft *r*, from which the hour and meridian wheels are simultaneously driven. When the minute-wheel stands at "59," the lever 11 and cam-wheel 2 are in the position indicated in Fig. 8, in which the end of the lever rests against the highest point of the cam, immediately adjacent the drop thereof. On the next movement of the minute-wheel to turn up the numerals "0 0" the cam passes out of engagement with the end of the lever, which moves upwardly under the tension of the spring 16′, rocking the shaft 12, as well as the escapement-lever 14. The solid tooth 17 of the escapement-lever is therefore moved out of engagement with its wheel, while the pivoted tooth, moving toward the wheel, catches the approaching tooth thereof, but yields sufficiently to permit the rotation of the escapement-wheel 19 one step, thereby permitting the hour-wheel to turn up the next number.

By turning the minute-hand the minute-wheel shaft, with its cam, may be moved backward by reason of the ratchet-and-pawl connection 1 3 to adjust the minute-printing wheel. The hour and meridian printing wheels are adjusted by rocking the shaft 12, thereby operating the escapement-lever 14 to permit the forward movement of the hour escapement-wheel. In order, however, to prevent the described backward movement of the minute-printing wheel by strains exerted on the exposed periphery of the wheel, I secure to the front end of the minute-wheel shaft a ratchet-wheel 20, with which a spring-pressed lever-pawl 21, pivoted on the frame, normally engages and prevents such backward movement of the minute-printing wheel. Thus neither the hour and meridian wheel, which moves with it, nor the minute-printing wheel can be moved until the inclosing locked casing, in which this apparatus is to be placed, has been removed. On such removal the pawl 21 may be pressed out of engagement with the ratchet-wheel 20, thereby permitting backward movement of the minute-wheel and its shaft. Backward movement of the hour and meridian wheels is at all times prevented by a spring detent-pawl 22, which engages the gear *s*, that drives the meridian-wheel M. Of course this pawl might be applied to the gear *t*, since *s* and *t* are fixed on the same shaft.

I claim as my invention—

1. In a time-stamp, the combination of the driven minute-printing wheel, its escapement-wheel, a toothed escapement-lever coöperating therewith, a clock-train operatively connected with the escapement-lever to rock it positively in both directions, an hour-printing wheel, its escapement-lever controlled on the rotation of the minute escapement-wheel to advance the hour-wheel step by step, means for independently rocking the hour-wheel-escapement lever to advance the hour-wheel for adjustment and a back-stop or detent for preventing backward movement of the hour-printing wheel.

2. In a time-stamp, the combination of a driven minute-printing wheel, its escapement-wheel and escapement-lever coöperating therewith, a clock-train operatively connected with the lever, a cam mounted on the axis of the minute escapement-wheel, the escapement-wheel of the hour-printing wheel, an escapement-lever coöperating therewith having one solid and one yielding tooth, and a lever bearing on the cam and acting to rock the escapement-lever of the hour-wheel.

3. In a time-stamp, the combination of the driven minute-printing wheel, its escapement-wheel and escapement-lever controlling the step-by-step movement of the escapement-wheel, a lever actuated through one complete movement on each complete rotation of the minute escapement-wheel, the hour-printing wheel, its escapement-lever and a spring connection between said lever and the hour escapement-lever whereby, when the lever is rocked, the escapement-lever is correspondingly actuated but the latter may be independently rocked by overcoming the tension of the spring to advance the hour escapement-wheel step by step.

4. In a time-stamp, the combination of the minute-printing wheel, its escapement-wheel, the escapement-lever coöperating therewith, the hour-printing wheel, its escapement-wheel and escapement-lever coöperating therewith, a rock-shaft on which the last-named escapement-lever is fixed, a lever loosely mounted on said rock-shaft and actuated once in each revolution of the minute escapement-wheel, and a spring connecting the said lever and the hour escapement-lever whereby as the lever is actuated the hour escapement-lever is correspondingly actuated but the rock-shaft may be rocked independently of the lever by overcoming the tension of the connecting-spring to thereby advance the hour-wheel step by step.

5. In a time-stamp, the combination of the minute-printing wheel, the minute-shaft, a minute escapement-wheel rotatable about the shaft, a pawl-and-ratchet connection between the escapement-wheel and shaft by which the latter may be turned in one direction independently of the former, a second pawl-and-ratchet connection between the shaft and the frame whereby the minute-shaft is prevented from being turned in the opposite direction and means whereby the last-named pawl and ratchet may be disconnected to permit rotation of the minute-shaft for adjustment of the minute-printing wheel.

In testimony whereof I have hereunto subscribed my name.

WILBUR I. FOLLETT.

Witnesses:

L. F. Browning,

E. F. Wicks.